United States Patent [19]

Romanek

[11] 4,265,954
[45] May 5, 1981

[54] SELECTIVE-AREA FUSION OF NON-WOVEN FABRICS

[75] Inventor: Gerald A. Romanek, Greenville, S.C.

[73] Assignee: Phillips Petroleum Company, Bartlesville, Okla.

[21] Appl. No.: 895,338

[22] Filed: Apr. 11, 1978

[51] Int. Cl.³ .............................................. B32B 3/02
[52] U.S. Cl. ........................................ 428/85; 156/72;
156/181; 156/272; 264/25; 428/95; 428/131;
428/195; 428/288; 428/296; 156/290; 156/297;
156/308.4; 430/11; 430/330
[58] Field of Search ...................... 428/85, 90, 95, 131,
428/132, 137, 195, 211, 288, 296, 198, 195;
156/72, 181, 272, 273, 274, 296, 305, 308, 290;
264/22, 25, 129, 132, 327; 427/160, 288;
118/641

[56] References Cited

U.S. PATENT DOCUMENTS

| 2,464,301 | 3/1949 | Francis | 156/220 |
|---|---|---|---|
| 2,875,092 | 2/1959 | Cline | 427/160 |
| 2,891,279 | 6/1959 | Neumann | 156/282 |
| 3,265,527 | 8/1966 | Adelman et al. | 428/283 |
| 3,276,944 | 10/1966 | Lerry | 156/306 |
| 3,339,001 | 8/1967 | Petry et al. | 264/231 |
| 3,454,414 | 7/1969 | Andes et al. | 427/160 |
| 3,660,555 | 5/1972 | Rams et al. | 264/126 |
| 3,787,260 | 1/1974 | Passler et al. | 156/272 |
| 3,804,691 | 4/1974 | Trevedi | 156/272 |
| 3,878,019 | 4/1975 | Chapman et al. | 264/22 |
| 3,912,567 | 10/1975 | Schwartz | 428/296 |
| 3,949,127 | 4/1976 | Ostermeier et al. | 428/296 |
| 4,035,219 | 7/1977 | Cumbers | 428/296 |
| 4,056,421 | 11/1977 | Jarvis | 156/272 |
| 4,100,319 | 7/1978 | Schwartz | 428/296 |

Primary Examiner—James J. Bell

[57] ABSTRACT

A non-woven sheet or web of fibers, containing at least some thermoplastic fibers, is fused to consolidate the fibers, bond another sheet of material thereto, perforate the sheet or bind tufting fibers therein by heating the sheet to a temperature and for a time sufficient to fuse at least some of the fibers in preselected areas of the sheet while simultaneously blocking heat transmission to the non-selected areas, or by pretreating patterned areas of the sheet to increase or decrease the heat-absorptivity of the patterned areas relative to the remainder of the sheet and thereafter heating the sheet. Improved non-woven fabrics, consolidated in preselected areas, non-woven fabrics bonded to another sheet material in preselected areas, non-woven fabrics perforated in predetermined areas and non-woven fabric substrates firmly holding tufting materials in preselected areas, are also produced.

32 Claims, 8 Drawing Figures

SELECTIVE-AREA FUSION OF NON-WOVEN FABRICS

BACKGROUND OF THE INVENTION

The present invention relates to the fusion of non-woven sheets or webs of fibers to fuse and/or perforate the sheets or webs in preselected areas.

It is known in the prior art to subject non-woven sheets or webs of synthetic fibers to textile needling operations in order to stabilize or consolidate the sheet or web or to bind another sheet or web thereto. While this technique does provide a certain degree of stabilization or strengthening of the sheet or web and/or binding of another sheet or web thereto, it is well accepted that for certain end uses, this treatment is insufficient to produce a finished product and accordingly some form of additional fusing or binding is necessary.

It is also known that thermoplastic, non-woven sheets or webs of fibers may be stabilized or consolidated and/or bonded to another sheet or web, either over its entire surface or in preselected areas, by subjecting the sheet or web to radiant heat or by passing the same over heated rollers, both under pressure and at a temperature sufficient to fuse at least some of the fibers of the sheet or web. However, these methods are somewhat inflexible as to their operating conditions, and, therefore, it has been difficult to operate at commercially economical line speeds and the rolls utilized to heat preselected areas are expensive, time consuming to change and therefore lack versatility. Another major difficulty of such methods lies in the fact that the heating step must be carefully controlled to insure that the fibers are brought to the correct temperature and maintained at that temperature for a proper length of time and under carefully controlled pressure in order to produce the desired end product. Overheating of the sheet or web will result in total fusion of the fibers while underheating will cause insufficient fusion. If the sheet is underheated, it results in a structurally weak material. On the other hand, where the sheet or web is fused over its entire surface, it acquires a harsh hand and is too stiff or paper-like to be useful for a number of purposes.

Yet another method of consolidating or binding a sheet or web of thermoplastic fibers, either over the entire surface thereof or in predetermined areas, has been suggested in which the temperature is maintained well below the fusion temperature of the thermoplastic fiber but at which tack develops. This technique often results in inadequate fusion.

Other techniques which are applied to bind or consolidate in preselected areas or over the entire surface of a sheet or web of synthetic fibers, involve the deposition of polymerizable or copolymerizable materials on the sheet or web and effecting copolymerization or polymerization by exposure to light, the deposition of graft polymers on the sheet or web and effecting polymerization by passing the sheet or web over heated rollers or the deposition of chemically reactive liquids on the sheet or web and effecting chemical reactions by exposure to heat or light. These techniques all have the common disadvantage of requiring somewhat complicated equipment to deposit the treating materials on the sheet or web and also suffer from the inherent disadvantage of requiring additional materials, which are in and of themselves expensive. Further, in addition to the requirement of extra equipment for effecting deposition of the binding material on a sheet or web, such techniques also require means for drying or curing the adhesive or other material. Finally, these methods do little, if anything, to achieve the desired finish on the non-woven fabric and, hence, further steps are required to provide the proper finish. In this instance, the finishing may consist of resaturation and perhaps curing.

Yet another technique for fusing thermoplastic, synthetic fiber materials, particularly as a substitute for sewing in the production of quilted multilayer materials, is the utilization of ultrasonic energy to bond or weld the layers together at preselected points. In this technique, pins are placed in the required pattern across the entire width and around the circumference of a roll. The roll is fitted with a series of sonic "horns", which bear against the pins, and ultrasonic energy is imparted to the pins. This high-speed vibration develops heat in the textile materials at the points of contact with the pins and the pressure exerted by the pins presses the molten mass into weld spots. While this technique effectively accomplishes the desired purposes of producing a quilted material having good flexibility and a soft hand, and excellent binding of the layers is attained, there are obvious disadvantages. Among these are the facts that the equipment is expensive, a great deal of skill is required, both in the operation and maintenance of the equipment, the pattern can be changed only with great difficulty and the equipment is relatively delicate.

It is therefore an object of the present invention to provide an improved method of fusing or perforating a sheet or web of non-woven fibers, containing at least some thermoplastic synthetic fibers, at preselected points or areas, which overcomes the above-mentioned disadvantages of the prior art as well as others not mentioned herein. Another object of the present invention is to provide improved sheet or web materails of non-woven fibers, containing at least some thermoplastic synthetic fibers.

SUMMARY OF THE INVENTION

The above and other objects of the present invention are accomplished by exposing an extended, flat body of non-woven fibrous materials, containing at least some thermoplastic fibers, to heat, from a source of heat, spaced from the body of fibrous materials, at a temperature and for a time at least sufficient to fuse some of the thermoplastic fibers while concentrating the heat from the source of heat in preselected areas of the body of fibrous materials, to thereby fuse at least some of the thermoplastic fibers and/or perforate the body of fibrous materials in the preselected areas. Novel sheets or webs of such non-woven fibrous materials, containing at least some thermoplastic fibers, are produced in which the fibers are fused or consolidated in preselected areas, the sheet or web is fused to a sheet or web of another material, the sheet or web is perforated in preselected areas and tufting fibers are rigidly bound in a substrate of such a sheet or web, thus firmly binding tufting materials therein and having an improved density of tufting.

DETAILED DESCRIPTION OF THE INVENTION

Figure 1:
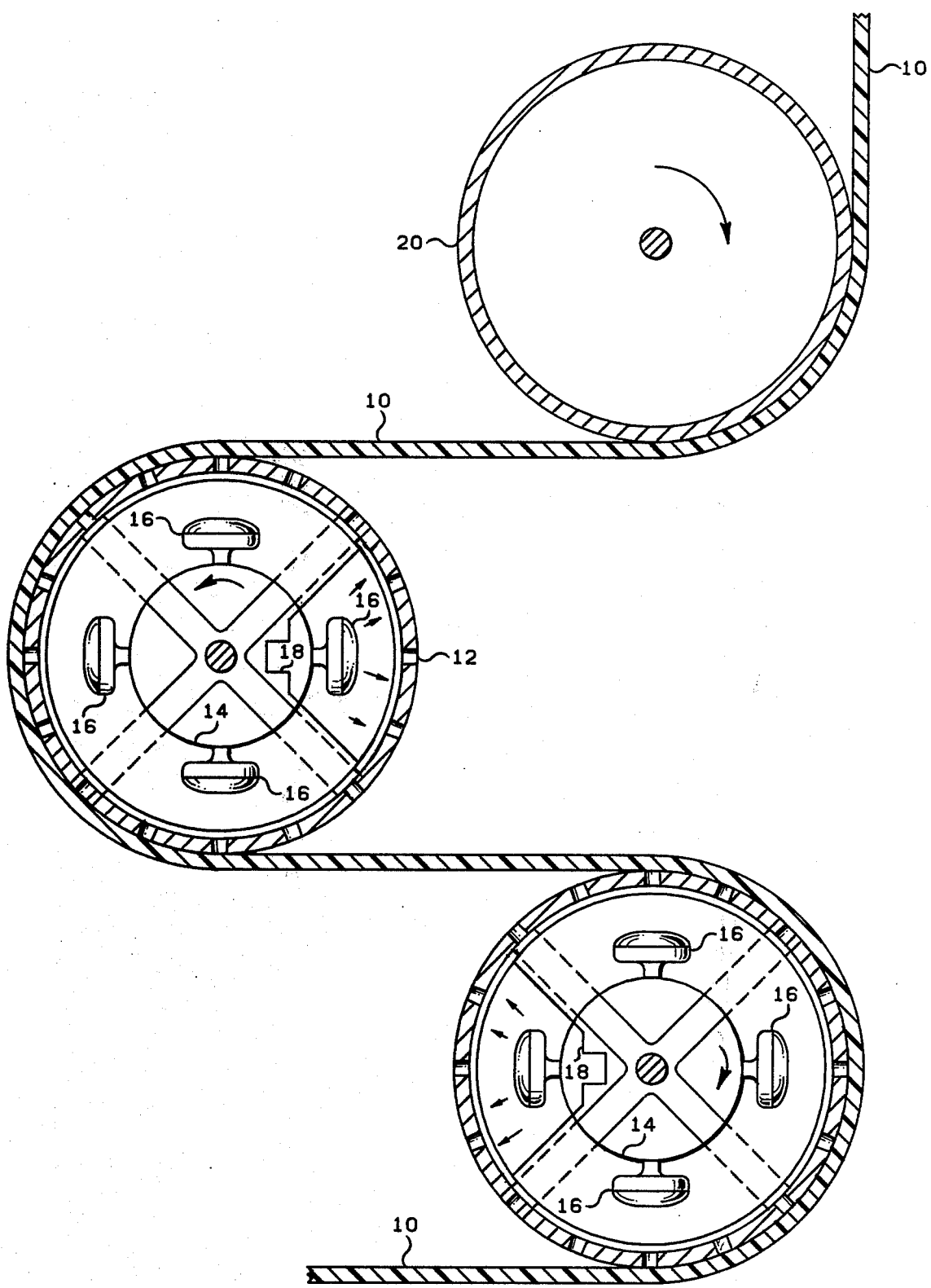
FIGS. 1 and 2 are schematic, cross-sectional views of two types of apparatus for practicing the method of the present invention.

The present invention is applicable to any non-woven fibrous materials, in the form of needled or unneedled batts, sheets or webs and containing at least some thermoplastic fibers. The sheet or web may consist entirely of thermoplastic fusible fibers or it can be a blend of fusible fiber with other synthetic or natural fibrous materials. The sheet or web may be formed by any conventional means. For example, fibers can be continuously deposited on a traveling conveyor from a carding machine, in which case all fibers will be oriented in the direction of web travel. Alternatively, the fibers can be cross-lapped by layering a unidirectional oriented web from one or more cards or garnets back and forth on a moving conveyor. Yet another method involves depositing the fibers on a conveyor by air deposition, thereby giving a random orientation. Sheets or webs formed by any of the above methods can be utilized in the present process and products.

Non-woven fibrous materials, whch can be utilized in the present invention, include substantially all of the synthetic thermoplastic materials. Polyolefins, such as polymers of ethylene, propylene, butene and copolymers and blends thereof are particularly suitable. Also suitable are polyesters, polyamides, polyurethanes, cellulosics, acrylics, modacrylics, vinyl polymers or other known organic thermoplastics and blends thereof capable of being formed into filaments. The sheet or web may contain as little as 10 percent of the thermoplastic. Particularly suitable for making a backing or substrate for carpet is a substrate of polypropylene.

The sheet or web may be unneedled or subjected to a conventional textile needling operation prior to the application of the fusion process of the present invention. When a needled or unneedled sheet or web is treated, in accordance with the present invention, it has been found that a material having a soft hand and excellent flexibility and drape, essentially the same as an unfused sheet or web, can be produced, while at the same time providing the dimensional stability and strength attained by essentially complete fusion of the entire surface of the textile material. However, when a sheet or web has been subjected to complete fusion of the entire surface, in accordance with prior art techniques, high dimensional stability and strength are provided but the material is stiff and has a harsh hand.

In one aspect of the present invention the selective area fusion of a sheet or web of non-woven, organic thermoplastic fibers is accomplished by first subjecting the web or sheet to a simple and economical pretreatment. In accordance with this treatment, the web or sheet has deposited thereon, in a patterned area, a material which will modify the heat absorptivity of the patterned area relative to the remainder of the body of fibrous material. It should be noted at this point that the term "patterned areas", when used herein, refers to a pattern of spots or dots, continuous stripes, a continuous shaped pattern such as a diamond or expanded metal-type pattern, a pattern of squares, circles, or any other desired configuration, and that the patterned area may be fused or unfused or perforated or unperforated by the hereinafter discussed fusion technique. Accordingly, the term "preselected areas", as used herein and as will appear hereinafter, refers to either the areas in which the pattern is formed or the areas outside of the pattern and which are thereinafter fused or perforated.

The pretreating material may be in any convenient form such as a liquid, a solution, a paste, an emulsion or the like. Any number of treating materials may be utilized, the only requirement being that the material modify the areas of the web or sheet on which it is deposited to increase or decrease the heat absorptivity thereof in the patterned areas relative to the remaining areas of the sheet or web. For example, water or an aqueous solution has been found to decrease the heat absorptivity of the areas of the sheet or web on which it is deposited. Accordingly, the areas of the sheet or web on which this material is deposited will be the unfused or preselected areas of the sheet or web. By contrast, an oleaginous material, deposited in the patterned areas of the sheet or web, renders the treated areas more heat absorptive than the untreated areas. Therefore, the treated, patterned areas will fuse while the untreated areas outside of the patterned area will be the unfused areas. A very convenient pretreatment, which can be utilized, is a pretreatment with conventional printing inks. For example, black, red or other dark inks will render the printed areas more heat absorptive than the unprinted areas, while silver, white or other light inks will render the printed areas less heat absorptive (by reflection) than the unprinted areas. Hence, in the former case the printed areas will be the preselected, fused areas, while in the latter case the printed areas will be the unfused areas and the unprinted areas will be the preselected, fused areas.

Following the pretreatment of the sheet or web, the sheet or web is exposed to a source of heat energy, which is spaced from the sheet or web rather than in contact therewith. This source of energy may take a wide variety of forms such as infrared, microwave or dielectric radiation, hot air, hot gas, steam and the like. The spacing between the source of energy and the web or sheet may vary over a wide range depending upon the type of energy, the intensity of the energy and the nature of the thermoplastic fibers of the sheet or web. For example, when the sheet or web contains polypropylene fibers and the radiation source is an infrared electrical foil heater or an infrared radiation lamp, the spacing may be anywhere from about one-half inch to thirty inches, preferably one-half to about one and one-half inches.

The treating materials may be applied to the patterned areas by any known means of deposition, such as, spraying through a stencil, printing, etc. However, the preferred technique is a simple printing technique in which the web or sheet is drawn over a printing roll having the printing pattern formed thereon or between the nip of two rollers, one of which or both of which have the printing pattern formed thereon. These techniques are well known in the art.

The treatment temperature, exposure time and intensity of the radiation are interrelated and depend upon the nature of the thermoplastic fibers as well as the degree of fusion desired. For example, the temperature may vary from between about 300° and 400° F. (148.7° and 232° C.). Where the source of heat energy is an infrared lamp, spaced as previously indicated, the source of energy may be operated in the range of about 50 to 100 percent of full power. While variations in the degree or nature of the fusion may be obtained by modifying the spacing of the source of heat from the web or sheet, the power of the source of energy, or the temperature at the surface of the web or sheet, the simplest means of varying the degree or nature of the fusion is to vary the time of exposure to the source of energy. Again, referring to an infrared lamp as a source of energy, operated at the powers previously mentioned and spaced from the web the distances previously mentioned, the time of treatment may vary anywhere between about 5 seconds and 6 minutes, or, preferably, about 5 and 25 seconds. When short exposure times are utilized, slight fusion in the preselected area is attained. At slightly higher exposure times, complete fusion of the preselected areas is attained. As the time of exposure is further increased, small holes develop in the preselected areas while leaving unfused fibers between the holes in such preselected areas. At still higher exposure times, holes are formed in the entire preselected area. Obviously, in the last instance, the preselected areas would be unconnected such as a plurality of dots, squares, rectangles, etc.

In another form of pretreatment, in accordance with the present invention, the patterned areas are densified, for example, by compressing the patterned areas at ambient temperatures. This, of course, can be readily accomplished by passing a web or sheet between the nip of a pair of rollers, one or both of which have the pattern embossed thereon. In this instance, the densified, patterned areas are preferentially fused by exposure to heat energy.

In yet another aspect of the present invention, the preliminary treatment of the web or sheet is eliminated. In this instance the patterned areas are formed and fusion is carried out simultaneously by drawing the web or sheet over a rotating drum, which is essentially impenetrable by heat energy and has the pattern formed by perforated or cut out portions of the drum corresponding to the pattern, or by carrying the sheet or web along a belt having the patterned areas formed as perforations through the belt, while, in both instances, simultaneously exposing the web or sheet to heat through the apertures from a source of heat energy located inside the drum or behind the belt. In this fashion, heat energy passes through the drum or belt to the sheet or web and fuses the web or sheet in the patterned areas, corresponding to the patterned apertures of the drum or belt, as the sheet or web passes in contact with the drum or belt. Similarly, the apertures may be formed in a heat-impervious plate and the web drawn past the plate.

Apparatus for carrying out the present invention is schematically shown in FIG. 1 of the drawings.

In accordance with FIG. 1, a web of thermoplastic material 10 is drawn over a pair of driven drums 12 in an S-type configuration. The drums 12 are essentially impenetrable by heat energy and have formed therein a plurality of round apertures. A stationary source of heat energy 14 is mounted in the drums and comprises a multiplicity or row of infrared lamps 16 and cooling air ducts 18. As the web passes over the drums 12, heat energy, from the source of heat 14, passes through the holes in drums 12 to thereby fuse the web 10 in the patterned areas formed by the holes in drums 12. By passing the web 10 over the pair of drums 12 in an S-type configuration, as shown in the drawing, both sides of the web are subjected to heat energy. In this instance the web 10 may be passed over an idler or driven roller 20 simply to change the direction of travel.

Figure 2:
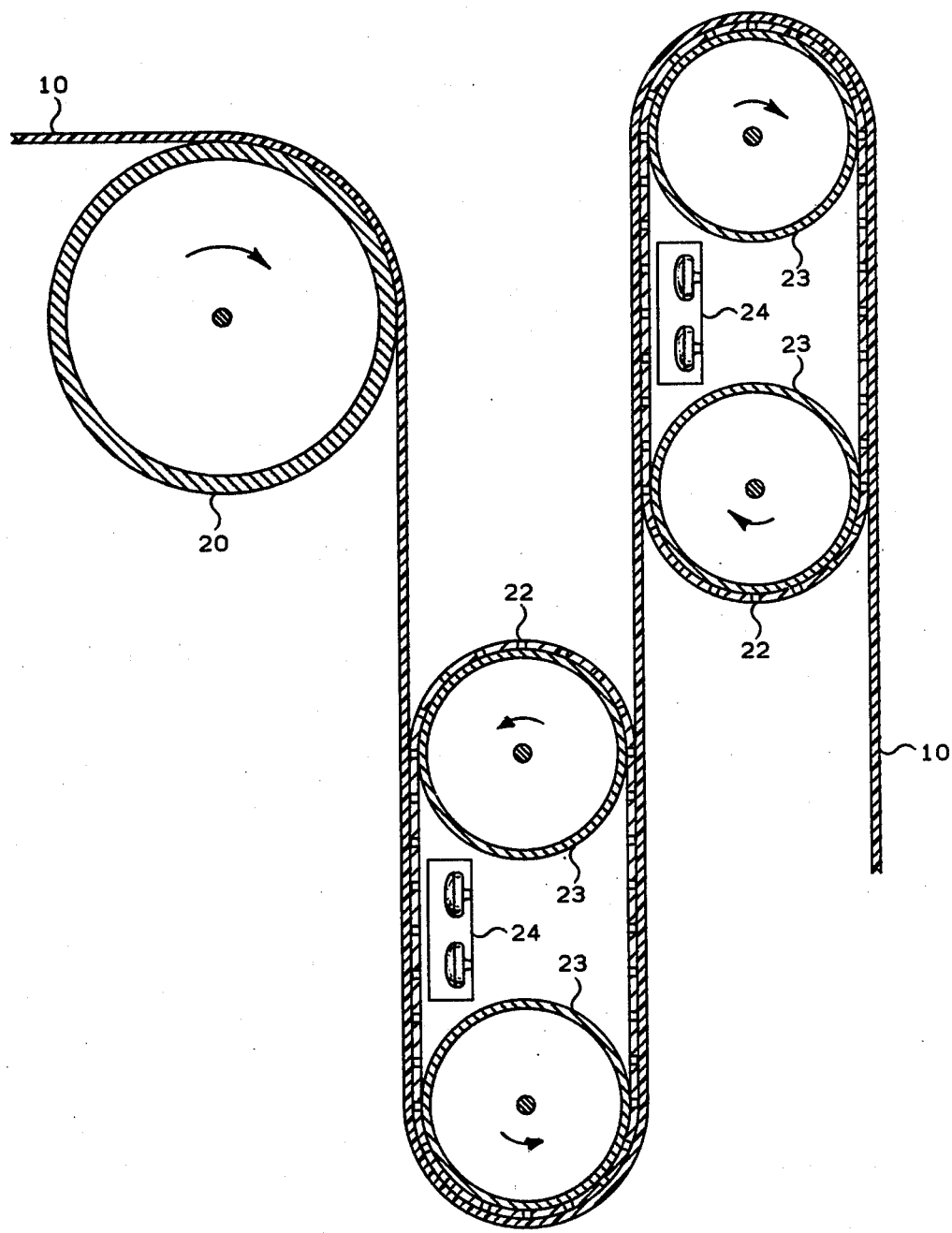
Figure 3:
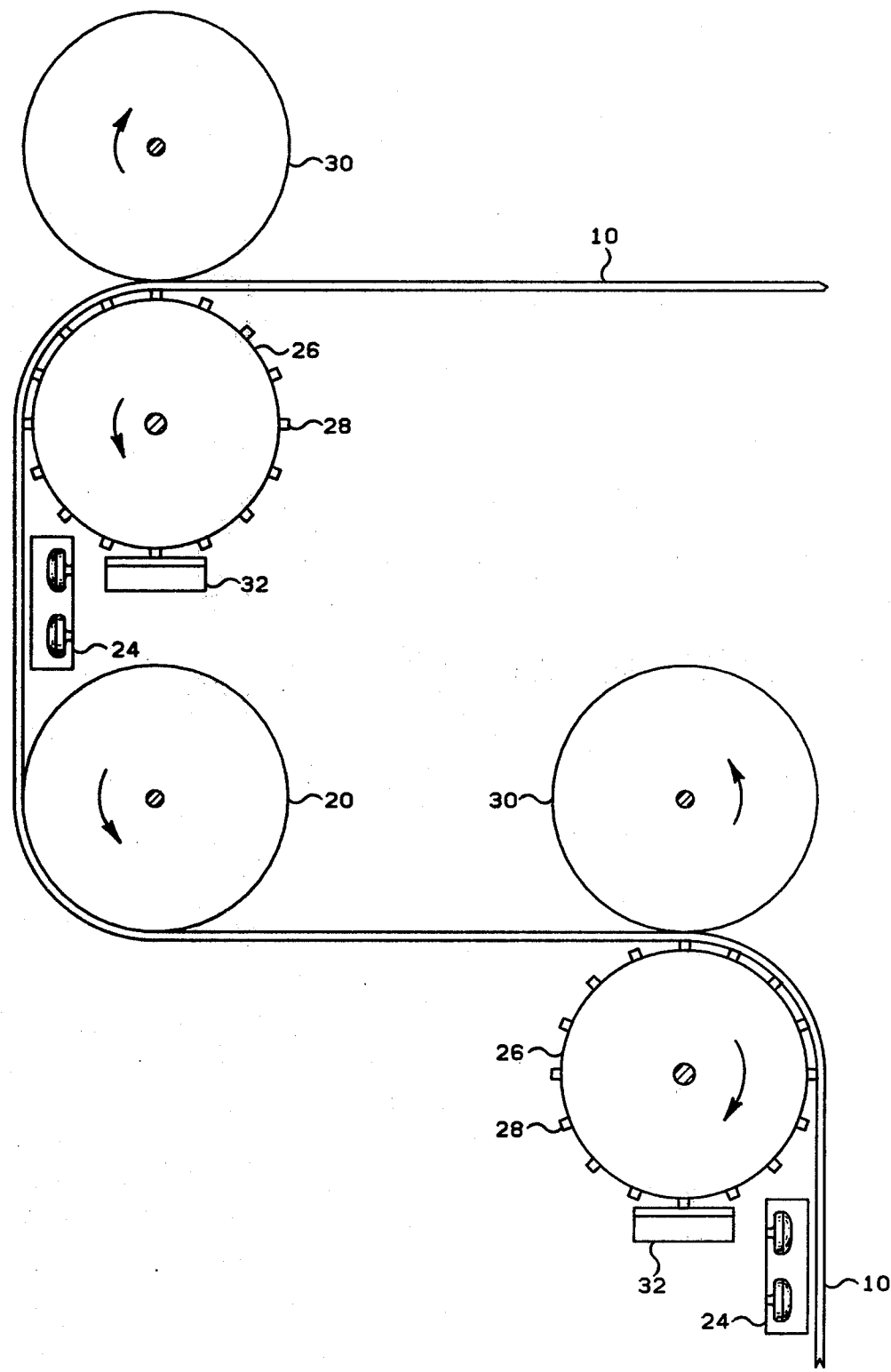
FIGS. 3 and 4 are schematic, elevational views of two additional types of apparatus for practicing the method.

An alternative apparatus is shown in FIG. 2. In this instance, rather than utilizing perforated drums 12, endless belts 22, impenetrable by heat energy, may carry the web 10 thereon as they pass over an appropriate arrangement of rollers 23, which in this case would be unperforated, conventional rollers. The web 10 would then be subjected to heat energy by heat sources 24 as the endless belt 22 and web 10 pass beneath the heat sources 24. By passing the web 10 and the belt 22 over the drums or rollers 12, in the S-type configuration shown, both sides of the web 10 would be subjected to heat treatment through the holes in the belt 22.

Where the web 10 is to be pretreated by densification or printing with a suitable pretreating material, apparatus such as that shown in FIG. 3 would be employed. According to FIG. 3, web 10 would pass over rollers 26 carrying appropriate embossing or printing lugs 28. Where the web 10 is to be densified, the lugs 28 would compress the patterned areas of web 10 by passing between the nip of embossing rollers 26 and compression rollers 30. Where a heat absorptivity modifying agent is to be applied to the web 10 by a printing-type process, the lugs 28 would press against pads 32 saturated with the treating agent, to thereby pick up the treating agent and deposit the same on the web 10. Where embossing or printing pretreatments are carried out, sources of heat energy such as heaters 24 would be utilized and idler 20 would simply change the direction of travel of the web 10.

Figure 4:
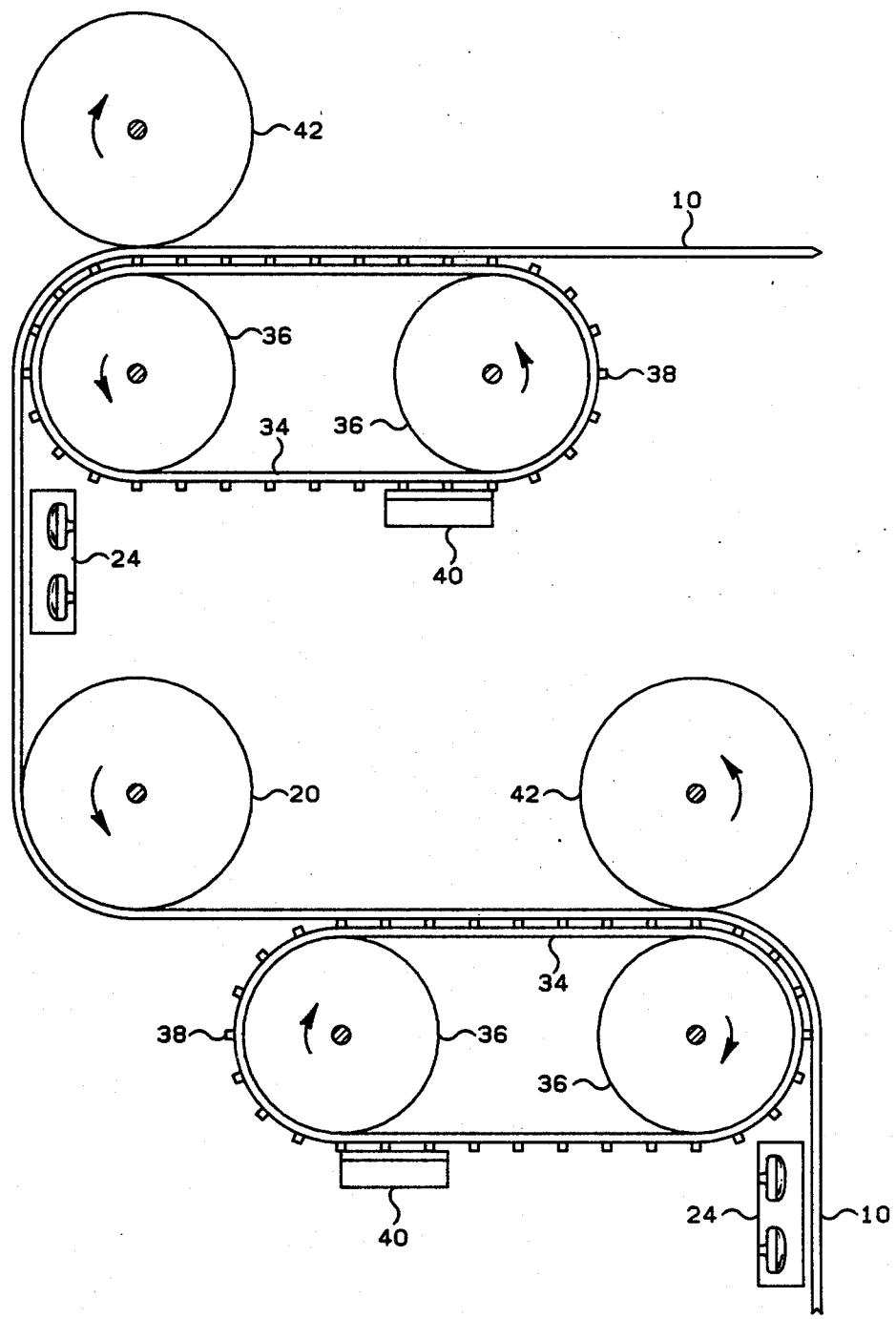
Figure 5:
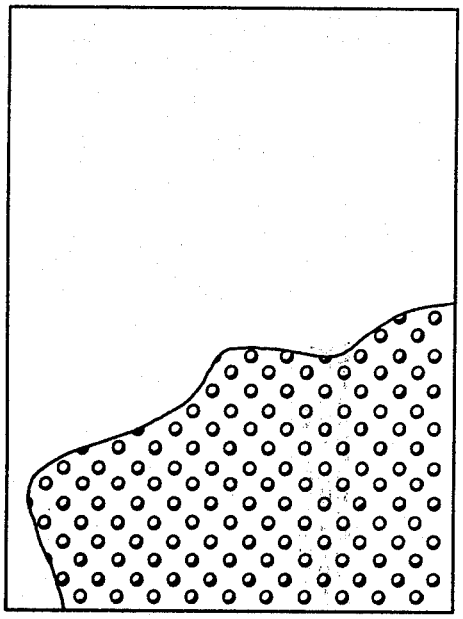
FIGS. 5, 6, 7 and 8, illustrate products produced in accordance with the present invention.
Figure 6:
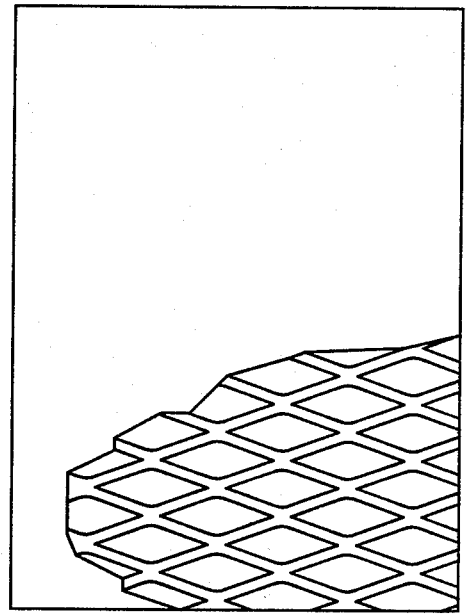
Figure 7:
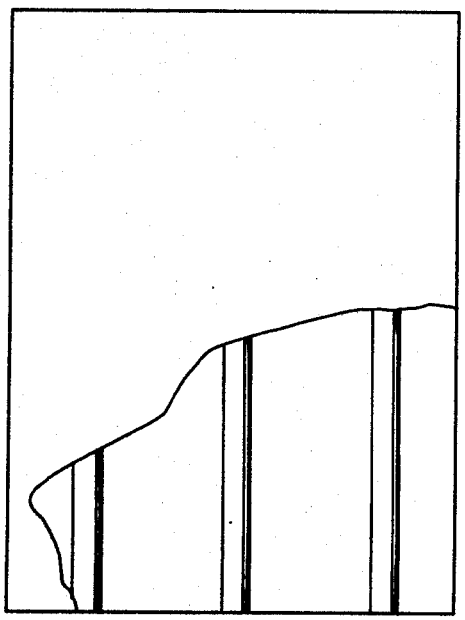
Figure 8:
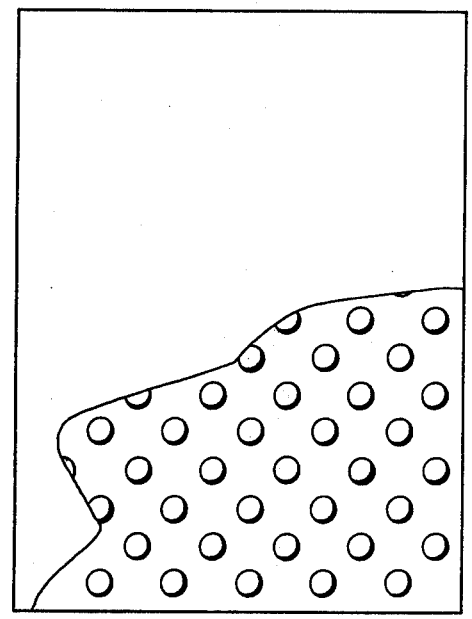

As illustrated in FIG. 4, the embossing or printing means could be an endless belt 34 carried over appropriate driven rollers 36. The belt carries printing or embossing lugs 38 and passes over an appropriate pad or the like 40 saturated with the treating agent. As the belt 34 and the web 10 pass between rollers 36 and compression rollers 42, the web is embossed or printed with the treating agent. The web 10 passes idler 20 to change the direction. The web 10 would be exposed to heat by heaters, such as heaters 24.

FIGS. 5 to 8 of the drawings illustrate sheets of fibrous material on which a variety of patterned areas are formed. For example, small dots, a diamond or expanded metal-type of pattern, a stripped pattern or a large dot pattern, as shown in FIGS. 2, 3, 4 and 5, respectively.

As is obvious from the preceding description and illustrations, a very large number of variations of the present invention can be carried out to provide a variety of different physical characteristics of stretch, strength and tear properties in a finished product. Also, a wide variety of products may be produced by varying the degree and nature of the fusion. As previously indicated, the method may be utilized to produce a consolidated bonded sheet of non-woven fibers and, in some instances, serve as a substitute for needling or it may be utilized after needling. Light or severe bonding may be carried out, depending upon the product desired, or, as previously indicated, the material may be simultaneously bonded and perforated. Materials produced in accordance with the present invention can be used for filters, perforated fabrics such as netting, bags, napkin covers, or other products requiring both strength and softness. By fusing in preselected areas immediately surrounding the points of contact of carpet tufting with a substrate of the fabric of the present invention, it has been found that increased locking or binding of the tufting material can be attained, if the fabric is prevented from shrinking during exposure to heat energy.

This can be accomplished by mounting the fabric on a tentering frame or on appropriate pins on the drum or drums during exposure of the web to heat. The improved binding occurs as a result of preferential shrinking in the preselected fused areas of the web and accordingly around the tufts of the carpeting. In a variation of the last-mentioned operation the substrate or backing of carpeting is permitted to shrink while being exposed to heat. In this instance, the shrinkage of the substrate increases the density of tufting of the finished product. Normally, the major fiber axis of a substrate is in the transverse direction of the fabric and the major fiber axis of the continuous yarns forming the tufting is in the longitudinal direction of the fabric. Therefore, shrinkage in the transverse direction will generally occur, giving the desired densifying effect. Unique and novel styling effects can also be accomplished in this manner.

The practice of the present invention is illustrated by the following specific examples. It is to be understood, however, that these examples are for illustrative purposes only and are not to be considered as limiting.

EXAMPLE 1

A sample of a needled web of fiber fill polypropylene fibers was placed on a small square pin frame. After placing the fabric on the pin frame, drops of water were deposited on the fabric in patterned areas. It was found that, since the water renders the treated areas less heat-absorptive than the untreated areas, upon exposure to infrared heat, utilizing a "Watlow Radiant Surface Heater", manufactured by Watlow-Electric Manufacturing Co. of St. Louis, Mo., the patterned portions or areas of the fabric treated with the drops of water remained unbonded while the untreated, preselected areas were bonded.

Another sample of the same fabric was subjected to infrared heat, except that the water was placed on the fabric in a rectangular pattern. The rectangular patterned areas remained unbonded while the preselected areas or remainder of the fabric was bonded.

EXAMPLE 2

A sample of the same fabric was pretreated to form a pattern with a light machine oil. In this case, it was found that the patterned areas, containing the machine oil, had a higher heat absorptivity than the untreated areas. Consequently, when the fabric was exposed to heat by the infrared heater, holes were produced in the fabric in the patterned areas containing the oil (also the preselected areas here) while the untreated areas remained unfused.

EXAMPLE 3

Additional samples were treated, as above, to form various treated, patterned areas, but instead of using the infrared heater as a heat source, a hot air gun was utilized.

It was also noted, when making the tests referred to above, that the fabric tends to shrink upon initial heating. After this occurs the fabric stretches back to its original size, if it has been tentered on a frame or the like. The center section thus is drafted, because the shrinking forces of the portions surrounding the treated areas are greater and the fiber in the center is almost at its melting point. With continued heating, the center section completely melts out. Accordingly, this preferential shrinking is advantageous when the fabric is utilized as a substrate for a tufted carpeting. Ordinarily, when such a tufted carpeting is made, the tufted yarn is relatively easy to remove after the tufting operation. However, when utilizing the process of the present invention, the tufting is bound much more securely. This treatment also tends to stabilize the resultant fabric by reducing the elongation and improving the fabric's strength. Proper control of heating in this instance precludes embrittlement of the fabric. The face yarns, which are often nylon, remain unaffected.

If, when utilizing the present invention on a tufted carpeting, the fabric substrate is not restrained or tentered, the fabric readily shrinks in width and an increase in the density of the tufting is attained. Such shrinking is in the range of about 30 to 75 percent and thus the result is of great advantage to the carpet tufter. In addition, if the radiation is carried out on a preferential basis, unique and novel styling effects can be accomplished.

EXAMPLE 4

Samples of the previously-mentioned polypropylene fabric were also treated to produce the patterns shown by FIGS. 2–5 with various screens having the patterns cut from the screen. The infrared heater power was varied between 100 percent, 80 percent and 50 percent power and the distance of the heater to the sample was varied between 24¼ (60.625 cm.) to 26¼ inches (66.675 cm.).

In the above experiments, times were varied from 8 seconds through 6 minutes and the degree of fusion was found to vary from slight fusion to the formation of holes through the fabric.

EXAMPLE 5

In yet another set of experiments, the infrared heater was set at 80 percent power with the distance between the heater and the fabric about ¾ inch (1.90 cm.), plus or minus 1/16 inch (0.159 cm.). This was found to be the most reasonable distance between the heater and the fabric. A heat impervious screen was utilized, with large round holes formed therethrough. The following results were obtained:

| Time, Seconds | Comments |
| --- | --- |
| 17 | Barely fused. |
| 18 | Fused substantially all the way through, forming small lumps on the beard side. |
| 19 | Fused and beginning to make small holes through the fabric. Some fibers still remain where the holes are being formed. |
| 20 | Burning holes, but still some fabric in burned areas. |

EXAMPLE 6

Similarly, a series of tests was run utilizing a diamond-shape pattern in an impervious screen. The following results were obtained:

| Time, Seconds | Appearance |
| --- | --- |
| 6 | Fused in open spaces with some unfused fibers in the spaces. The heat was not evenly spread. |
| 7 | All melted and fused in the open areas with no unfused |

-continued

| Time, Seconds | Appearance |
| --- | --- |
| 8 | spaces in the patterned areas. Making holes in patterned areas, with some fibers still remaining. The space between the holes was clear but evenly fused. |

EXAMPLE 7

Yet another series of experiments was run, utilizing a screen with large holes therethrough and an infrared heater operating at 80 percent and spaced ¾ of an inch (1.90 cm.), plus or minus 1/16 inch (0.159 cm.) from the fabric.

| Time, Seconds | Appearance |
| --- | --- |
| 15 | Barely fused. |
| 18 | Holes fused through fabric. |
| 19 | Holes fused through fabric with some fiber still in. |
| 20 | Holes through pattern with all fibers burned out. |

EXAMPLE 8

Another series of samples was treated, in the same fashion, without stretching the fabric on the frame. It was observed that when heating was started and fusion began, the fabric would shrink.

| Time, Seconds | Appearance |
| --- | --- |
| 17 | Barely fused. |
| 19 | Fused on face only. |
| 20 | Starts shrinking and making holes. |

EXAMPLE 9

A series of samples was also run, wherein the sample was needled with paper tissue in the web, to determine whether the paper had any affect on the fusion. With the paper tissue, fusion occurred in the same fashion previously observed but the resultant fabric was much softer.

EXAMPLE 10

In another series of runs, a sheet of aluminum foil was placed directly under the fabric, which was needled with paper tissue, to determine whether the aluminum foil would in any way, affect the fusion. It was found that the aluminum foil had no affect on the fusion but bonding did take place. The following results were obtained:

| Time, Seconds | Appearance |
| --- | --- |
| 15 | Barely fused. |
| 17 | Fused on surface only. |
| 18 | Fused and making some holes. |
| 20 | Fused and holes formed; however, back is soft and heat did not burn the paper. |

EXAMPLE 11

Yet another series of experiments was carried out with the fabric fused on an aluminum foil sheet. The following results were obtained:

| Time, Seconds | Appearance |
| --- | --- |
| 18 | Barely fused. |
| 20 | Made some holes and fused all the way through. |
| 22 | Made holes but unfused between holes. |

In the instances where the aluminum foil was utilized, the fabric was softer than fabrics fused without the aluminum foil.

While specific examples and illustrations are set forth above, it is to be understood that such examples and illustrative embodiments are by way of example only and that various modifications thereof will be obvious to one skilled in the art.

What is claimed is:

1. A method for physically fusing preselected areas by the application of heat while leaving unfused adjacent, nonselected areas of an extended, flat body of nonwoven, fibrous material, containing at least some thermoplastic fibers; comprising, exposing said fibrous material to heat, from a source of radiant energy adapted to produce heat in said body of fibrous material, spaced from said body of fibrous material and radiating over an area of said body of fibrous material including both said preselected and said nonselected areas, at a temperature and for a time at least sufficient to fuse at least some of said thermoplastic fibers and concentrating the heat from said source of energy in said preselected areas by (a) modifying the heat absorptivity of said preselected areas of said body of fibrous material, (b) modifying the heat absorptivity of said nonselected areas of said body of fibrous material, (c) interposing between said body of fibrous material and said source of energy a mask having areas of increased radiant energy transmission corresponding to said preselected areas of said body of fibrous material, (d) interposing between said body of fibrous material and said source of energy a mask having areas of decreased radiant energy transmission corresponding to said nonselected areas of said body of fibrous material or (e) any combination of at least two of (a), (b), (c) and (d).

2. A method in accordance with claim 1 wherein the source of energy is an infrared source.

3. A method in accordance with claim 1 wherein the source of energy is a dielectric source.

4. A method in accordance with claim 1 wherein the source of energy is a microwave source.

5. A method in accordance with claim 1 wherein the heat is concentrated in the preselected areas by modifying the body of fibrous materials to render said body of fibrous materials more heat absorptive in said preselected areas than in the nonselected areas of said body of fibrous materials.

6. A method in accordance with claim 5 wherein the heat absorptivity of the preselected areas is increased by applying a heat absorbing coating in said preselected areas.

7. A method in accordance with claim 6 wherein the heat absorbing coating is an oleaginous material.

8. A method in accordance with claim 5 wherein the heat absorptivity of the preselected areas is increased by densifying the fibrous material in said preselected areas.

9. A method in accordance with claim 5 wherein the fibrous material is densified in the preselected areas by subjecting said preselected areas to pressure prior to exposing said fibrous material to the source of energy.

10. A method in accordance with claim 1 wherein the heat is concentrated in the preselected areas by modifying the body of fibrous material to render said body of fibrous materials less heat absorptive in the nonselected areas than in the preselected areas of said body of fibrous materials.

11. A method in accordance with claim 10 wherein the heat absorptivity of the nonselected areas is decreased by applying a coating of reduced heat absorptivity in said nonselected areas.

12. A method in accordance with claim 11 wherein the coating of reduced heat absorptivity is an aqueous solution.

13. A method in accordance with claim 1 wherein the heat is concentrated in the preselected areas by interposing between the body of fibrous material and the source of energy a mask having areas, corresponding to said preselected areas of said body of fibrous material modified to render said mask more transparent to radiant energy than the remaining areas thereof.

14. A method in accordance with claim 1 wherein the heat is concentrated in the preselected areas by interposing between the body of fibrous material and the source of energy a mask having areas, corresponding to the nonselected areas of said body of fibrous material, modified to render said mask less transparent to radiant energy than the remaining areas thereof.

15. A method in accordance with claim 1 wherein the heat is concentrated in the preselected areas by interposing between the body of fibrous material and the source of energy a mask relatively impervious to the transmission of radiant energy in the areas of said body of fibrous material corresponding to the nonselected areas and cut out in a configuration corresponding to said preselected areas of said body of fibrous material.

16. A method in accordance with claim 15 wherein the mask is in the form of the outer surface of at least rotatable roller and the body of fibrous material is continuously drawn over the surface of said roller.

17. A method in accordance with claim 16 wherein the source of energy is a stationary source mounted within the roller.

18. A method in accordance with claim 16 wherein the mask is in the form of two spaced, rotatable rollers, the source of energy is a source of energy within each of said rollers and the body of fibrous material is continuously drawn over the surfaces of said rollers in an S-type configuration to thereby expose both sides of said body of fibrous material to said source of energy.

19. A method in accordance with claim 15 wherein the mask is a moving belt and the body of fibrous material is maintained in contact with and carried along with said belt.

20. A method in accordance with claim 1 wherein the temperature and time of exposure of the body of fibrous material to the source of energy is sufficient to form a plurality of perforations in at least part of the preselected areas of said body of fibrous material.

21. A method in accordance with claim 1 wherein the temperature and time of exposure of the body of fibrous material to the source of energy is sufficient to form perforations in the entire preselected areas of said body of fibrous material.

22. A method in accordance with claim 1 wherein at least one second, extended, flat body of material is placed in contact with the body of fibrous material and the temperature and time of exposure to the source of energy is sufficient to bond said body of fibrous material to said second body of material in the preselected areas.

23. A method in accordance with claim 22 wherein the second body of material is paper.

24. A method in accordance with claim 22 wherein the second body of material is aluminum foil.

25. A method in accordance with claim 22 wherein the second body of material is a second body of nonwoven fibrous material.

26. A method in accordance with claim 1 wherein the body of fibrous material is prevented from shrinking during exposure to the source of energy, fibrous tufting materials are associated with said body of fibrous material and the preselected areas are selected to generally correspond to the points of contact of said tufting materials with said body of fibrous material.

27. A method in accordance with claim 1 wherein the body of fibrous material is permitted to shrink during exposure to the source of energy, fibrous tufting materials are associated with said body of fibrous material and the preselected areas are selected to generally correspond to the points of contact of said tufting materials with said body of fibrous material.

28. A method in accordance with claim 27 wherein the body of fibrous material is permitted to shrink in direction parallel to the major axis of the fibers of said body of fibrous material.

29. An extended, flat body of nonwoven, fibrous material, containing at least some thermoplastic fibers and having tufting materials combined in at least some preselected areas of said body of fibrous material, by exposing said fibrous material to heat, from a source of radiant energy adapted to produce heat in said body of fibrous material, spaced from said body of fibrous material and radiating over an area of said body of fibrous material including both said preselected areas and adjacent, nonselected areas of said body of fibrous material, at a temperature and for a time sufficient to fuse at least some of said thermoplastic fibers and concentrating the heat from said source of energy in said preselected areas of said body of fibrous material, to fuse at least some of said thermoplastic fibers in said preselected areas where said tufting materials contact said body of fibrous material.

30. A nonwoven, fibrous material in accordance with claim 29 wherein the body of fibrous material is prevented from shrinking during exposure to the source of energy.

31. A nonwoven, fibrous material in accordance with claim 29 wherein the body of fibrous material is permitted to shrink during exposure to the source of energy.

32. A nonwoven, fibrous material in accordance with claim 31 wherein the body of fibrous material is permitted to shrink in a direction parallel to the major axis of the fibers of said body of fibrous material.

* * * * *